United States Patent [19]

Sabuncu

[11] Patent Number: 5,798,704
[45] Date of Patent: Aug. 25, 1998

[54] EARTHQUAKE ESCAPE LIGHT

[76] Inventor: Ohannes Sabuncu, 9757 Yolanda Ave., Northridge, Calif. 91324

[21] Appl. No.: 689,676

[22] Filed: Aug. 13, 1996

[51] Int. Cl.[6] ................................................. G08B 25/08
[52] U.S. Cl. ........................... 340/692; 340/628; 340/690; 307/117
[58] Field of Search .................................. 340/692, 690, 340/601, 628; 324/301, 323; 73/654; 200/61.45 R, DIG. 9; 307/117

[56] References Cited

U.S. PATENT DOCUMENTS

| | | | |
|---|---|---|---|
| 4,262,289 | 4/1981 | Rivera | 340/690 |
| 4,364,033 | 12/1982 | Tsay | 340/690 |
| 4,764,762 | 8/1988 | Almour | 340/690 |
| 4,789,922 | 12/1988 | Cheshire | 362/158 |
| 4,796,015 | 1/1989 | Admire, Jr. | 340/628 |
| 4,833,461 | 5/1989 | Yeager | 307/117 |
| 4,841,288 | 6/1989 | Addicks | 362/158 |
| 4,945,347 | 7/1990 | Perry | 340/690 |
| 4,978,948 | 12/1990 | Samen | 362/158 |
| 5,146,209 | 9/1992 | Beghelli | 340/628 |
| 5,184,889 | 2/1993 | Vasquez | 362/158 |
| 5,418,523 | 5/1995 | Anderson et al. | 340/690 |

*Primary Examiner*—Jeffery A. Hofsass
*Assistant Examiner*—John A. Tweel, Jr.
*Attorney, Agent, or Firm*—Patent & Trademark Services; Thomas Zack; Joseph H. McGlynn

[57] ABSTRACT

An earthquake escape light system having several different triggering systems. In one system vibrations are sensed as several steel balls move between two plates with the upper plate being connected to an upright member. At the lower end of this upright member is a steel ball normally electrically insulated from a lower conducting surface. Vibrations will cause the steel lower ball to contact the lower conducting surface and complete an electrical path to a light source. Alternately, the upper plate may have an arm with a hook end attached to it. This end restrains a pivotally mounted tube with mercury within from completing an electric circuit to a light source. When vibrations occur the hook comes off to complete the circuit. In another embodiment two magnets normally equally attract the free end of a electrically connected spring. When this end is subject to vibrations one of the magnets attracts it to complete a circuit to a light source. Sound above a specific level may also be used to complete an electrical circuit to a light source.

2 Claims, 3 Drawing Sheets

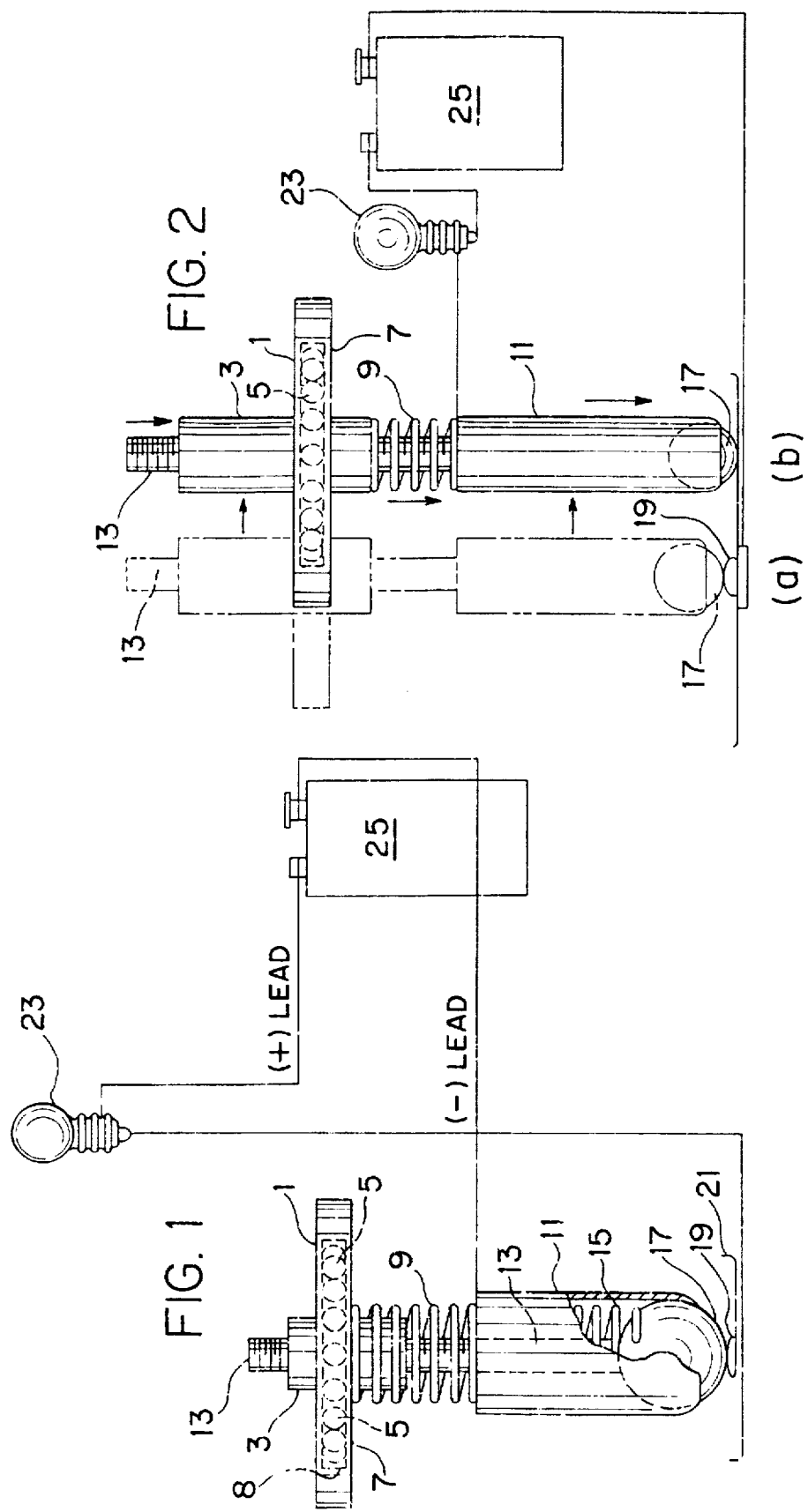

EARTHQUAKE ESCAPE LIGHT

BACKGROUND OF THE INVENTION

When an earthquake occurs there may be considerable damage to life and property including disruption of normal utility services. Should the earthquake take place during the night hours that possible lack of adequate lighting would only add to the victims confusion and concerns and may escape that much more difficult. The present invention provides for a battery operated escape light which is triggered on by the earthquake's vibration to permit victims to find their way to a protected place safety and quickly.

DESCRIPTION OF THE PRIOR ART

Earthquake safety lights are known in the art. For example, in U.S. Pat. No. 4,789,922 to Cheshire, an earthquake battery powered safety light whose circuit actuation is triggered by a displaced weighted object like a steel ball. In the Addicks reference—U.S. Pat. No. 4,841,288—a wall mounted housing having a battery powered light source with a latching circuit wherein the circuit and its light is activated by a motion detector switch. The night light disclosed in the Samen patent (U.S. Pat. No. 4,978,948) reflects on an overhead suspended spherical crystal mounted to move in a pendulous direction. And in U.S. Pat. No. 5,184,889 to Vasquez a mercury switch during an earthquake acts with a first on switch to effect actuation of a battery powered light. The present invention improves on these earthquake actuated light sources by providing for the activation of the light source regardless of the direction earthquake induced movement takes place as set forth herein.

SUMMARY OF THE INVENTION

A system for triggering the actuation of a battery operated light source when earthquake induced vibrations are received. Three methods to sense and trigger the activation of the light source are disclosed.

In one method, an upper plate separated by rolling surfaces rides on a lower plate which is mounted on an electrically conducting upright member. At the lower end of this upright member is a rolling conductive surface separate from a conductive ring by an electrically insulating member. The conductive ring is electrically connected to one terminal for a light and power source. The other terminal is connected to the upright member. When earthquake induced vibrations occur, regardless of the direction, the upper plate with its attached upright member will roll on the lower plate. This rolling action will cause the upright's lower rolling conductive surface to move off its insulating member and contact the conductive ring to complete the circuit and actuate the light.

In the another method a tube having mercury in it is restrained such that the mercury completes an electric circuit to the light source. When a pivoted lever attached to the restraining member is moved by the earthquake's vibrations, the member is released and the light actuated.

Both the methods may be combined into one operating unit or a third method may also be used. The third triggering method utilizes two magnets with a free end of a metal member attached to a base between them. When vibrations occur the free end is moved towards either one of the magnets completing a circuit to the light source.

Alternately, sound may be used to trigger the light source.

It is the primary object of the present invention to provide for an improved earthquake triggered light source.

Another object is to provide for the triggering of the light source regardless of the direction vibrations are received.

These and other objects and advantages of the present invention will become apparent to readers from a consideration of the ensuing description and the accompanying drawings.

BRIEF DESCRIPTION OF THE DRAWINGS

FIG. 1 is a side view of a first triggering system before its light source has been actuated.

FIG. 2 is another side view of the FIG. 1 system after triggered.

DESCRIPTION OF THE PREFERRED EMBODIMENT

Figure 4:
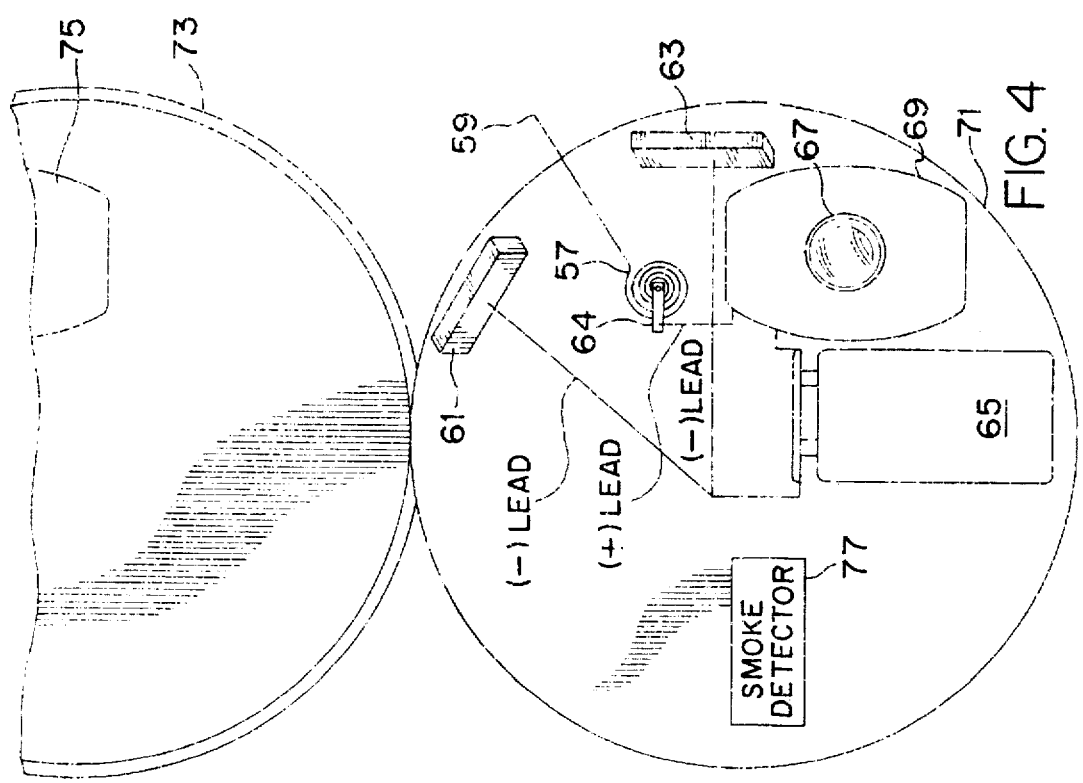
FIG. 4 depicts a third triggering system housed with in a conventional smoke detector.

FIG. 1 is a side view of a first triggering system before its light source has been actuated by earthquake vibrations. One of the important advantages of this embodiment over many other triggering systems is that vibrations in any direction will cause the triggering to take place. Thus, vibrations need not come from a specific direction or directions for it to perform its intended function.

In FIG. 1 an upper round metal plate 1 is attached at its center to the upper end of an aluminum upright pipe 3. Below this plate are several steel rolling balls 5 which ride on a lower metal round plate 7 larger in diameter than the upper plate 1. The upper plate's outer rim 8 may be rounded downwardly to insure retention of the steel ball 5. Below larger plate 7 is a tensioning spring 9 which bears against the lower plate at its top end to sandwich and retain the rolling steel balls between the two plates. This spring encircles the aluminum pipe 3 below the lower plate. At the spring's lower end there is a vertical tube 11 through which a vertical threaded metal rod 13 extends. This rod at its upper end also extends through the upper aluminum pipe 3 and terminates at its lower end at the lower end internal spring 15 shown in the cut away sectional view. This lower spring, along with the vertical hollow tube 11 at its lower opened end, engages a steel ball 17. Thus an electrically conductive path is available from the lower steel ball 17, through spring 15 and rod 13.

Steel ball 17 rests on electrically insulated small plastic surface 19 at its lower end. Surrounding this nonconducting plastic surface is an electrically conducting inverted metal washer 21. As shown, washer 21 is hard wired to the light source 23 and battery 25 has one terminal (+) connected to the light source and one terminal (−) connected to the threaded conductive metal rod 13. Since, interposed nonconducting plastic surface 19 prevents a completed circuit, light 23 in this view is not on.

FIG. 2 is another side view of the FIG. 1 system after triggered by an earthquake vibration to turn on light source 23.

The dotted line left (a) shows the threaded metal rod 13 as it appears before the earthquakes vibrations are felt (i.e., as in FIG. 1) with the top plates omitted for simplicity purposes. After vibrations designated by the direction of the arrows occur, the upper smaller plate 1 and its attached rod 13 roll on members 5 on lower larger plate 7. A center hole (not shown) in plate 7 smaller than the upper plate and steel balls but larger than the rod 13 permits this movement. The upper solid line (b) view shows the movement of plates and rod 13 due to the vibrations and the lower solid line view indicates the movement of these components shown. Lower steel ball 19 is no longer on plastic surface 19 and contacts inverted metal washer 21. This contact with washer 21 completes the electric circuit to lamp 23 through battery 25. All of the components shown in FIGS. 1–2 may be housed in a common housing that can be conveniently mounted to a surface such as a ceiling or vertical wall such as with a smoke detector.

Figure 3:
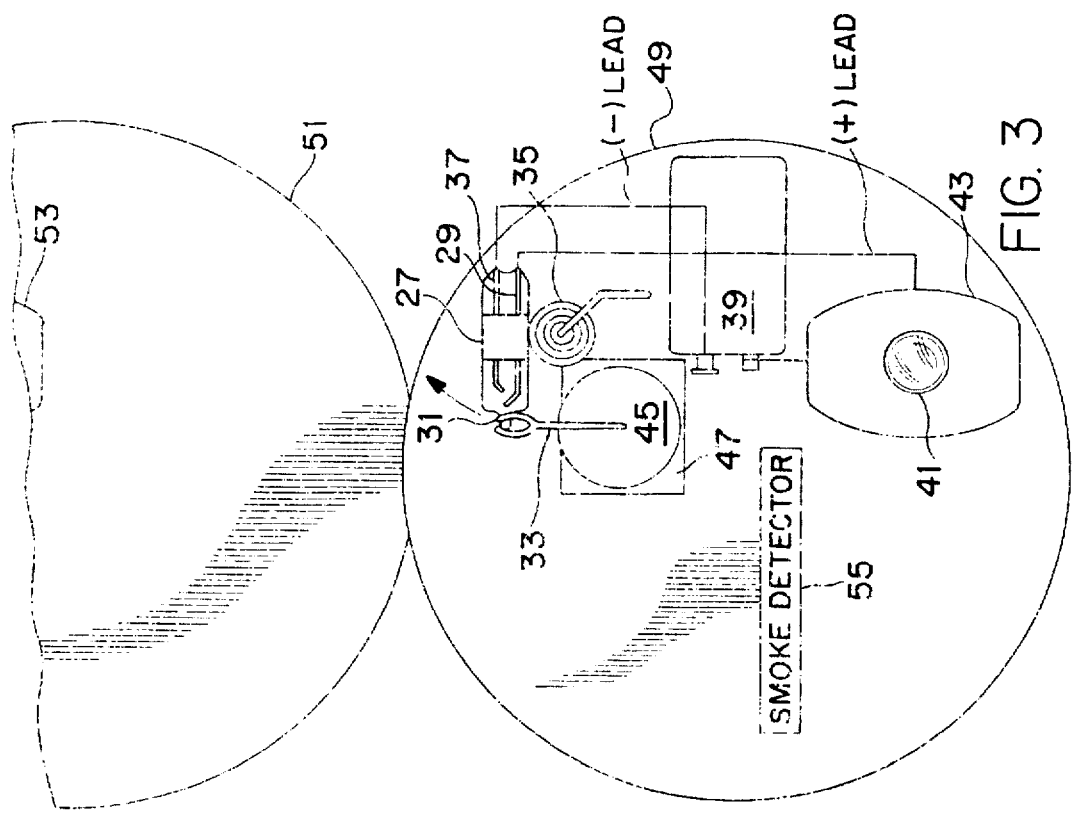
FIG. 3 shows the FIG. 1 system combined with another triggering method.
Figure 5:
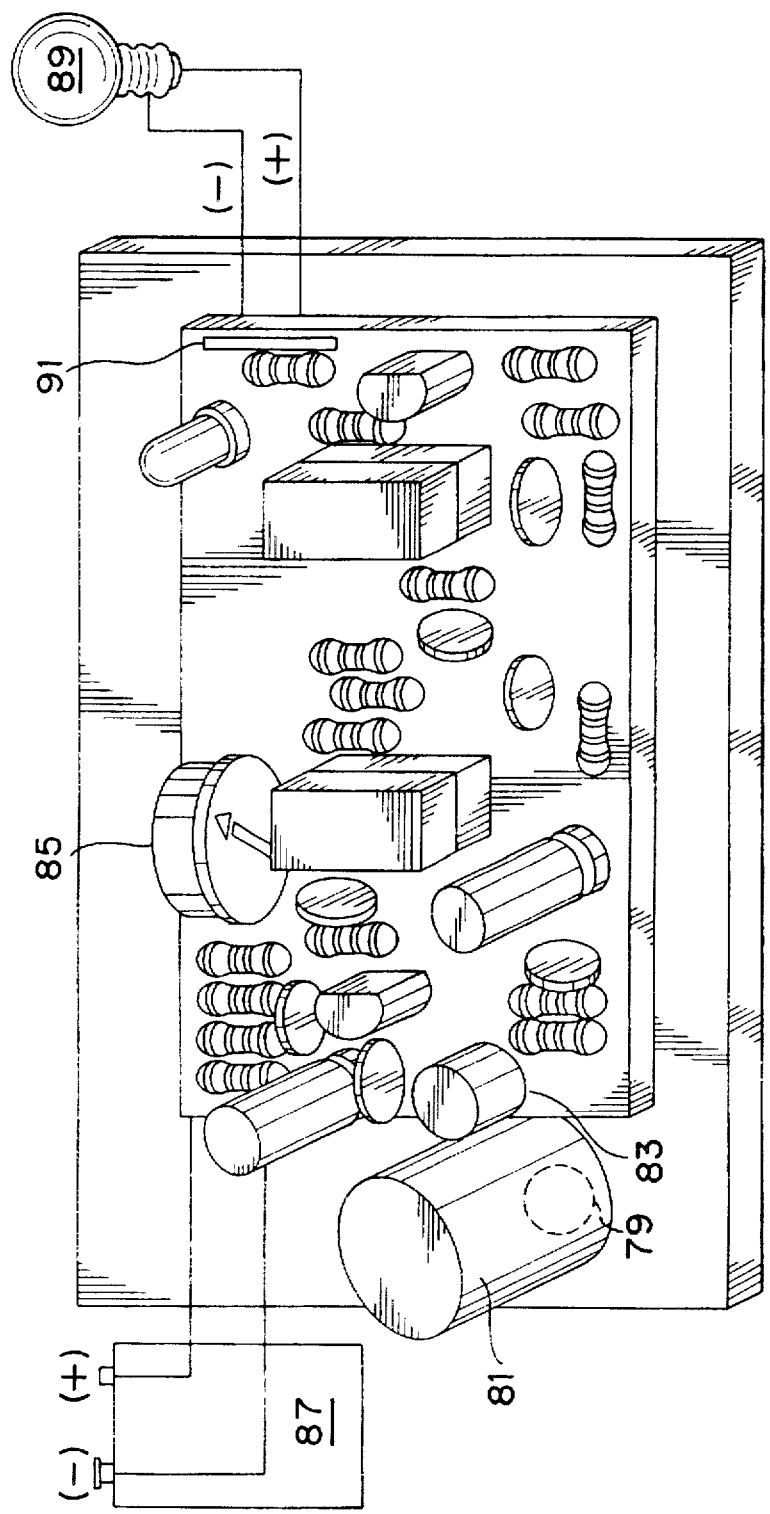
FIG. 5 shows a sound triggering system.

FIG. 3 shows some of the components used in FIG. 1 system combined with another triggering system. This other triggering system uses a closed tube 27 having a small amount of flowable mercury 29 in it. Connected to the mercury tube's protruding front end 31 is a restraining hook 33. Bearing against the lower surface of the tube 27 is a bimetal spring 35 which would normally force the tube to pivot upward (in the direction of the arrow) on its end restrained by hook 33. Extending through the tube are terminal separated wire ends 37 which are not electrically conducting in this figure. A power source (battery) 39 and light source 41 are both connected to each other and the battery is connected to one of the tube's two terminal ends. A light reflector 43 used in conjunction with the light source 41 is electrically connected to the battery and to the other of the tube's terminal ends. At the hook's other end is the plate 45—like plate 1 in FIG.1—which rides on steel balls (not shown) on the larger lower plate 47 (similar to plate 7 in FIG. 1). Earthquake vibrations move upper plate 45 (as in the FIG. 1 embodiment) over the lower plate and also move the attached hook 33. Sufficient movement of hook 33 will release it upper non fixed end and the restrained tube 27 causing the tube to tilt upward along with its enclosed mercury 29. The conductive mercury then flows to cover the two leads and acts like a conventional mercury switch to complete a circuit and supply electricity to the light source 41. A common plastic circular housing 49 having a hinged upper portion 51 with a lens 53 can enclose the described components and, if desired, a conventional smoke detector 55 having its own power source and circuitry.

A more vibration sensitive triggering system is depicted in FIG. 4. With this system a bimetal wound spring 57 has a free end 59 located appropriately equidistant between two permanent magnets 61 and 63. The inner other end of the spring is fixed to the housing and terminal 64. A 9 volt alkaline battery power source 65 is electrically connected to the light source 67 having silver surfaced reflector 69 surrounding it. As shown, one lead from the power source 65 is connected to the two magnets 61 and 63 while a lead from the light source is connected to the conductive wound spring 57. Like the FIG. 3 embodiment, a common housing 71 having a hinged cover 73 with a lens 75 may be used. A conventional smoke detector 77 with its own power source and circuitry may also be combined in this housing. Normally, the light source circuitry is not operating and the spring's free end 59 is positioned about midway between the two magnets. However, when an earthquake vibrates this will move the unit's spring free end 59 which will move either closer to either magnet 61 or 63 and, if close enough, will be pulled toward it. When this happens a circuit is completed and light source 67 is triggered and activated. The free end 59 of the spring is also used as a reset arm. The free end, extending from the housing, can be simply moved to its original position where it rests in the slot located at the rim of the housing cover.

Still other triggering systems sound actuation are possible. For example, a freely movable steel ball 79 in a metal chamber 81 is placed next to a microphone 83. Earthquake vibrations imparted to the unit will result in the steel ball making sounds against the chamber walls which will be picked up by the microphone. The remaining electrical circuitry, including potentiometer 85 and battery power source 87, then act to complete a circuit to light source 89. With such a sound activated system it is essential that there be insulation from outside ambient noises to prevent false triggering. The potentiometer may be used to adjust the sensitivity of the system and the relay 91 to control its on duration.

Although the Earthquake Escape Light and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An earthquake escape light system within a common housing comprising:

a self-contained electrical power source;

a light source electrically connected to said power source;

at least two separated permanent magnetic sources electrically connected to said power source; and an electrically conductive extending arm connected to said light source and said power source, said extending arm having a coil spring member with a free end, said free end normally being maintained in an equilibrium position between said two magnetic sources by the magnetic forces of the magnets whereby earthquake vibrations will cause said coil spring's free end to move and become attracted to one of said two magnets to thereby complete an electric circuit to said connected light source through the extending arm.

2. The invention as claimed in claim 1 also including within said common housing a smoke detector unit with its own self-contained power source.

* * * * *